Jan. 6, 1925.

N. RORVIK

SPRING DEVICE

Filed Aug. 8, 1923

1,522,031

Inventor
Nels Rorvik
By Herbert E. Smith
Attorney

Patented Jan. 6, 1925.

1,522,031

UNITED STATES PATENT OFFICE.

NELS RORVIK, OF SPOKANE, WASHINGTON; EDWARD RORVIK ADMINISTRATOR OF SAID NELS RORVIK, DECEASED.

SPRING DEVICE.

Application filed August 8, 1923. Serial No. 656,336.

*To all whom it may concern:*

Be it known that I, NELS RORVIK, a citizen of the United States, residing at Spokane, in Spokane County and State of Washington, have invented certain new and useful Improvements in Spring Devices, of which the following is a specification.

My present invention relates to improvements in spring devices for use as shock absorbers performing the functions of cushioning the movement of automobiles. The device of the invention is adapted especially as a supplemental flexible suspension for combination with the transversely disposed springs located at the front and rear of automobiles of the Ford type. By the utilization of my supplemental spring device additional means are provided which are adaptable for use on existing cars without material change of the car construction or structure, and the conversion of the car for my purpose may be accomplished with facility and in the absence of skilled labor.

The invention may be said to reside in the combination and arrangements of parts involving the use of a specially constructed spring lever located at the opposite ends of the transverse spring and connected by the supplemental spring. These levers may be used singly in connection with the spring links of the automobile, or in some instances may be used in pairs, and are employed at both the front and rear of the auto motive vehicle.

In the accompanying drawings I have illustrated several exemplifications of the invention in which the parts are combined and arranged according to modes that have proven highly satisfactory and successful in actual service and embodying the principles of my invention.

Figure 1:
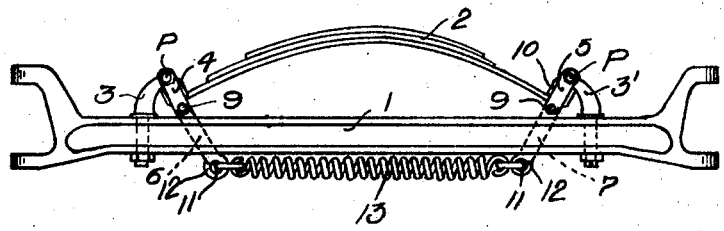
Figure 1 is a view in elevation of the front axle and transverse spring showing the combination therewith of the supplemental spring device of my invention utilizing single spring levers.

In order that the invention may readily be understood I have shown the front axle 1 and spring 2 in Fig. 1 as exemplifying the Ford type of automobile construction wherein the spindle-bolts 3 and 3' support the spring 2 from the pairs of pivoted links 4 and 5 at the ends of the spring.

Figure 2:
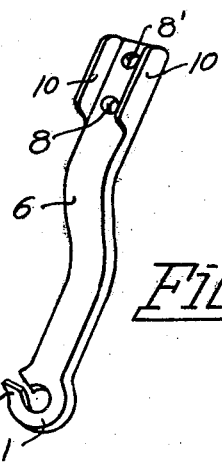
Figure 2 is a perspective view of one of the spring levers.

In connection with these links I utilize levers 6 and 7, one at each end of the spring 2 as shown in Fig. 1. The levers may be stamped or forged in suitable manner and made interchangeable or made in pairs for complementary use. In Figure 2 an interchangeable lever is illustrated as provided with a pair of spaced openings 8 and 8' of which openings the one designated 8 is designed to receive the bolt 9 for the spring 2 which passes through the links 4 and 5 in pairs and also through the lever.

If desired the bolt P which pivots the links 4 and 5 to the spindle bolts 3 and 3' may also be passed through opening 8' in some instances.

The levers may thus be suspended from both the bolts 9 and P of the links, or they may be suspended from either of these bolts as desired. In any event each lever is provided with a pair of opposed flanges 10, 10 projected from its lateral edges and located at the top thereof. These flanges are designed to lap over the edges of the spring links 4 and 5 to reinforce the links and to provide a firm and stable anchorage for the levers which are thus retained in parallelism and close relation to the links.

At their lower ends each link is fashioned with a perforated head 11 and a split lip 12 to accommodate the ends of the connecting spring 13 which is located beneath the axle and parallel therewith. The levers extend diagonally from above the axle to beneath the same, and the spring may be anchored between these levers by first passing the hooked ends of the spring between the split lips 12 and then the lip is hammered or otherwise flattened down flush with the head 11 to secure the spring end.

In this position it will be apparent that as the load depresses and elongates the spring 2, the movement of the spring will be absorbed by the supplemental spring 13 through the action of the combined links and levers, the spring 13 being extended as the spring 2 is flattened. The supplemental spring also reinforces the spring 2 in the performance of its functions.

Figure 3:
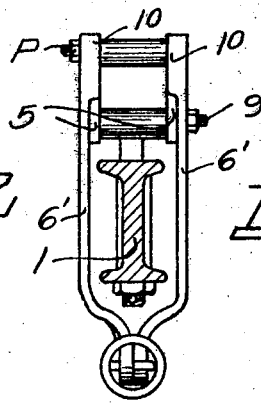
Figure 3 is an enlarged view showing an axle in transverse section and illustrating the relation thereto of a pair of levers when used in this manner.

In Figure 3 the levers designated as 6' are used in pairs one at the front and one at the rear of the axle 1 and they bear the same relation to the links 5 as that illustrated in Figure 1. In this instance the bolt opening 8 is adapted to receive the bolt 9' and the bolt opening 8' of the other link 6' is adapted to receive the bolt P.

Figure 4:
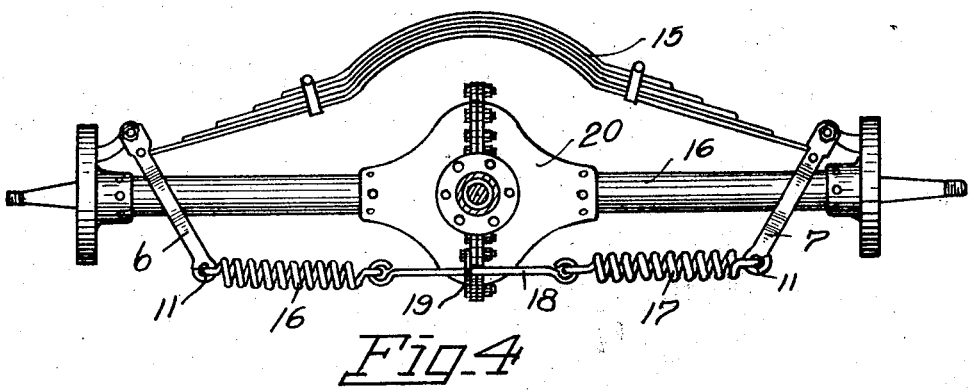
Figure 4 is a view showing in elevation the rear axle and spring with my supplemental spring device combined therewith in slightly modified form.

In Figure 4 the spring suspension device is shown in connection with the rear axle 14 and rear spring 15. Here the levers 6 and 7 are connected by a pair of alined springs 16 and 17 that are joined by a connecting rod or link 18 which passes through a perforated bracket 19 supported from the case 20 or other suitable support. In this construction the parts are guided by the movement of the slide link 18 in its bracket and the springs 16 and 17 are extended or contracted according to the spring movement.

As thus equipped the flanges of the levers prevent excessive wear or undue wear on the pivotal or bolt connections of the spring links, and the use of the levers in pairs, as in Fig. 3 insures a uniform pull of the spring 13 at both ends.

Having thus fully described my invention, what I claim as new and desire to secure by Letters Patent is—

The combination with a vehicle axle, a spring perch, a main spring, and shackle links having pivotal connections with said spring and perch, of lever arms rigidly secured on either side of said shackle links, opposed flanges on said lever arms engaging the edges of said shackle links, and a spring connecting the free ends of said levers.

In testimony whereof I affix my signature.

NELS RORVIK.